United States Patent [19]

Feiner et al.

[11] Patent Number: 5,579,369
[45] Date of Patent: Nov. 26, 1996

[54] FACILITY TYPE DETERMINATION TECHNIQUE

[75] Inventors: Alexander Feiner, Rumson; Burton R. Saltzberg, Middletown, both of N.J.

[73] Assignee: Lucent Technologies Inc., Murray Hill, N.J.

[21] Appl. No.: 540,693

[22] Filed: Oct. 11, 1995

Related U.S. Application Data

[63] Continuation of Ser. No. 173,332, Dec. 23, 1993, abandoned.

[51] Int. Cl.[6] .......................... H04M 1/24; H04M 3/08; H04M 3/22
[52] U.S. Cl. .................... 379/22; 379/1; 379/6; 379/10; 379/12; 379/14; 379/15; 379/27; 379/28; 379/29
[58] Field of Search ............................ 379/1, 6, 10–15, 379/22, 27, 28, 29, 93–100

[56] References Cited

U.S. PATENT DOCUMENTS

| | | | |
|---|---|---|---|
| 3,956,601 | 5/1976 | Harris | 379/21 |
| 4,023,098 | 5/1977 | Roth | 324/77 R |
| 4,069,392 | 1/1978 | Goldenberg . | |
| 4,093,940 | 6/1978 | Maniere | 379/22 |
| 4,188,580 | 2/1980 | Nicolai | 380/6 |
| 4,275,348 | 6/1981 | Bayer | 324/615 |
| 4,697,157 | 9/1987 | Buddecke | 455/1 |
| 4,864,612 | 9/1989 | Mahajan . | |
| 4,961,185 | 10/1990 | Sawada | 379/100 |
| 5,127,041 | 6/1992 | O'Sullivan | 379/98 |
| 5,134,611 | 7/1992 | Steinka | 379/94 |
| 5,144,230 | 9/1992 | Katoozi | 324/22.6 |
| 5,267,300 | 11/1993 | Kao | 379/94 |
| 5,311,569 | 5/1994 | Brozovich | 379/94 |

*Primary Examiner*—Wellington Chin
*Assistant Examiner*—Vijay Shankar
*Attorney, Agent, or Firm*—David R. Padnes; Otho B. Ross

[57] ABSTRACT

The disclosed facility type determination technique ascertains whether or not a facility connection is solely digital. In the disclosed embodiments, this information is used to establish the rate at which data is coupled through the facility connection. More specifically, a predetermined test signal including a pseudorandom sequence of digital signals is transmitted through the facility or combination of facilities connecting a data source to a data destination after the connection between the source and destination is established. The received test signal is examined at the destination and the examination results are used to determine the rate at which data is subsequently transmitted between the data source and data destination. Advantageously, this technique does not restrict network facility management and can be employed in a variety of data communication applications.

15 Claims, 2 Drawing Sheets

300

FACILITY TYPE DETERMINATION TECHNIQUE

This application is a continuation of application Ser. No. 08/173,332, filed Dec. 23, 1993 and now abandoned.

TECHNICAL FIELD

The present invention relates to communications systems and, more particularly, to a technique for determining the type of facility which will be transporting a data communication.

BACKGROUND OF THE INVENTION

Various types of facilities are used for transporting data communications. These types include a variety of metallic (non-carrier), analog carrier and digital carrier facilities. In the present public switched telephone network (PSTN), data rates of 9600 baud are routinely carded and data rates of up to 28.8 baud are contemplated. In general, the maximum data rate which can be transported in a given situation varies with the facility assigned to transport the communications. The data transport connection between network end-points may be a single facility or may be a combination of several facilities. In the former situation, the maximum data rate that may be allocated to the customer is that which may be transported by the assigned facility while in the latter situation the maximum data rate allocated to the customer is the data rate of the facility having the smallest maximum data rate in the facility combination. Complicating this process is the fact that the facility or facility combination assigned to a given connection may vary each time the connection is requested by the customer. As a result, the maximum data rate allocated to the customer can't exceed the maximum data rate transportable by the facility in the pool of such facilities which may be assigned to a particular connection. In applications where the data rate allocated to the customer using the above-described process is not acceptable, a facility or a combination of facilities or a subset of facilities types can be preassigned to transport data in a given application. While this solution meets a customer's data rate requirements, the preassignment restricts network facility management and often results in an increased network usage cost to the customer. Consequently, it would be extremely desirable if a technique could be devised which would permit greater data rates in a manner which would be transparent to an unrestricted network facility management scheme and, therefore, not likely to result in an increase of the network usage cost assessed to the customer.

SUMMARY OF THE INVENTION

The present invention is based on the recognition that the percentage of digital facilities in the network has rapidly increased with the deployment of digital switches. Accordingly, at any given time there is an increased likelihood that the facility or combination of facilities forming an end-to-end connection may permit a greater data rate than the allocation based on the mere possibility of some low data rate facility being assigned. Pursuant to the present invention, a predetermined test signal is transmitted from a dam source to a data destination after a facility connection is established therebetween. At the destination, the received test signal is examined and the result of this examination indicates the type of facilities connecting the data source and data destination.

In the disclosed embodiments, the predetermined test signal includes a sequence of digital signals which is transmitted through the facility or combination of facilities connecting a data source to a data destination after the connection between the source and destination is established. The received test signal is examined at the destination and the examination results are used to determine the rate at which data is subsequently transmitted between the data source and data destination. Advantageously, this technique does not restrict network facility management and can be employed in a variety of data communication applications.

DETAILED DESCRIPTION

Figure 1:
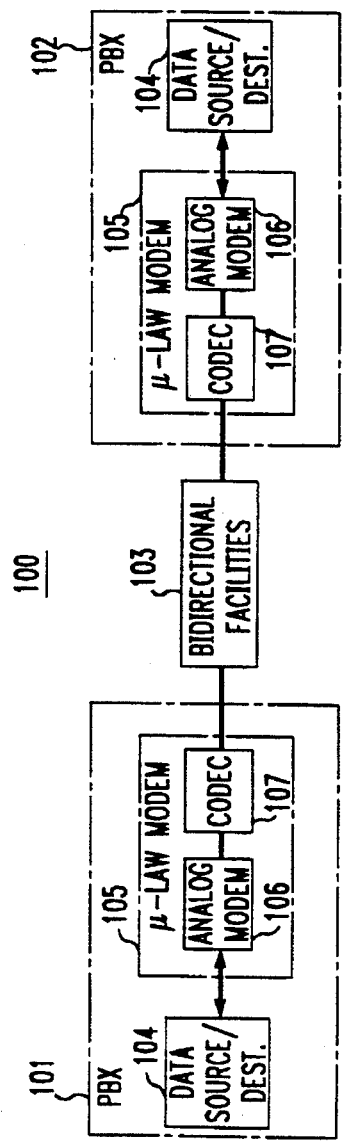
FIG. 1 is a block-schematic diagram of the prior art.

As shown in the prior an arrangement 100 of FIG. 1, data is coupled bidirectionally between private branch exchange (PBX) 101 and PBX 102 via a facility connection 103. Connection 103 may include one or a combination of metallic, analog carrier or digital carrier facilities. The media used by such facilities includes wire, air, optical fiber, etc. and the maximum data rate that can be transported varies with the actual facility or combination of facilities transporting data between PBX 101 and PBX 102. Facility connection 103 typically includes apparatus which operates on the transmitted data. However, for purposes of this application, the term "facility connection" does not include the apparatus located at the end-points of an established connection, i.e., PBX 101 and 102, shown in FIG. 1.

For purposes of discussion, it will be assumed that facility connection 103 forms part of the PSTN or an equivalent private network where the actual facility or combination of facilities transporting data between PBX 101 and 102 can vary over time. As a result, within each of the PBXs, a serial combination of a conventional analog modem 106 and a codec 107, collectively referred to as μ-law modem 105, is disposed between data source/destination 104 in each PBX and the facility connection 103. For purposes of illustration, it is assumed that each source/destination 104 both outputs data to connection 103 and receives data from this connection. Viewing the data signal processing from left to right in FIG. 1, analog modem 106 transforms the digital data from source/destination 104 into a modulated analog carrier signal using well-known modulation techniques, such as quadrature amplitude modulation (QAM). Codec 107 transforms the modulated carrier signal provided by analog modem 106 into a sequence of bits using any of a variety of well-known pulse code modulation (PCM) schemes. In this and the other embodiments which follow, the codec's output follows a weighting scheme, referred to as μ-law, so as to be compatible with transmission standards in the U.S. and other parts of the world. Of course, other weighting schemes, such as A-law, can be used in lieu of μ-law weighting. Furthermore, the function of analog modem 106 and codec 107 can be combined to directly transform the digital data outputted from data source/destination 104 into the codec'c digital output. Such a direct transformation obviates the need to actually generate the modulated analog carder signal.

Figure 2:
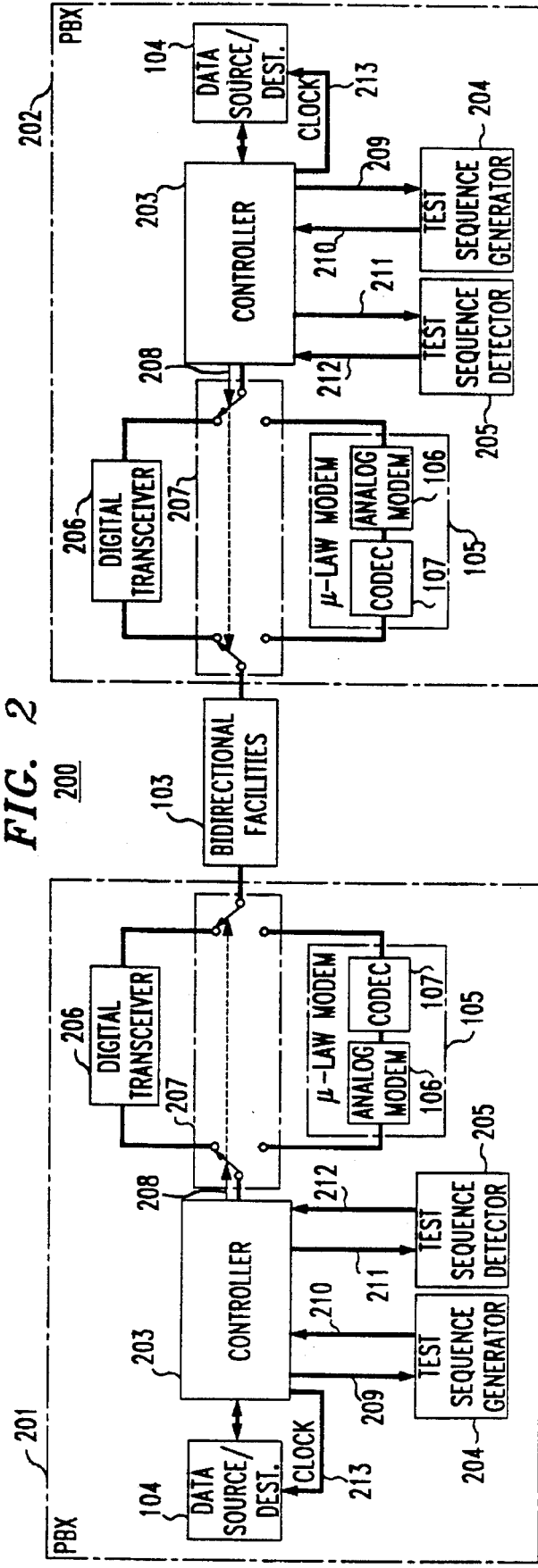
FIG. 2 is a block-schematic diagram of a first embodiment of the present invention.

Refer now to FIG. 2. In accordance with a first embodiment 200 of the present invention, each of PBX 201 and 202 incorporates additional apparatus compared to their counterparts in FIG. 1. This additional apparatus includes controller 203, digital transceiver 206, switch 207, test sequence generator 204 and test sequence detector 205. As will be described hereinbelow, this additional apparatus provides a determination of the type of facility, i.e., digital or non-digital, forming facility connection 103. This determination is then advantageously used to set the rate at which data is communicated between PBX 201 and PBX 202 to the maximum which may be reliably transmitted by facility connection 103.

For purposes of illustration, the embodiment of FIG. 2 will be described relative to the sequence of events which occur prior to the transmission of data from PBX 201 to PBX 202. Pursuant to the present invention, after a connection is established between PBX 201 and 202 and during the normal "handshaking" procedure prior to the transmission of data between PBX 201 and PBX 202, controller 203 in PBX 201 couples a control signal via lead 209 which causes test sequence generator 204 to output a predetermined test signal on lead 210. This test signal is coupled through the controller to switch 207. This switch, under the control of a signal provided on lead 208, couples the predetermined test signal through digital transceiver 206 to the facility connection 103. Digital transceiver 206 is of conventional type which provides an appropriate interface for the communication of digital signals at rates considerably higher than that coupled through μ-law modem 105. For example, transceiver 206 could be of the type that provides an appropriate interface for the ubiquitous T1 facility. At this juncture, it should be noted that the operation of digital transceiver 206 does not alter the value of any digital input. For example, if the digital input is a binary signal, then each logical "0" and "1" value supplied to the transceiver is coupled through it without any change in bit values. Within the transceiver, the bits may be reclocked and multiplexed with other bits, but these operations do not alter the value of each inputted bit. In contrast, the operation of analog modem 106 transforms a digital input into a modulated analog carrier signal. The operation of codec 107 then provides a digital representation of this modulated analog carrier signal. These serial operations, in general, alter the bit values that are coupled to the μ-law modem.

The transmitted predetermined test sequence is respectively received and examined by controller 203 and test sequence detector 205 in PBX 202. Within PBX 202, lead 211 couples the received predetermined test sequence to detector 205 and lead 212 couples an indication as to whether the received test sequence has been successfully detected. Successful detection in the disclosed embodiments corresponds to the received predetermined test sequence being identical to that expected by detector 205.

The acknowledgement signal generated within PBX 202 alters the operation of both PBX 202 and PBX 201. More specifically, within PBX 202 the acknowledgement signal is coupled to controller 203 where it is used to set the clock signal on lead 213 and toggle switch 207 so as to couple any subsequently received data through the appropriate interface, i.e., digital transceiver 206 or μ-law modem 105 in PBX 202. The acknowledgement signal generated within PBX 202 is also coupled back to PBX 201 via facilities connection 103. Within PBX 201, the acknowledgement signal causes controller 203 to toggle switch 207 so that the data transmitted from this PBX is coupled through the appropriate interface, i.e., digital transceiver 206 or μ-law modem 105. In addition, the controller 203 in PBX 201 supplies a clock signal on lead 213 which varies with the indication provided by the acknowledgement signal.

In particular, if the test sequence is properly detected within PBX 202, then the state of the acknowledgment signal, generated within this PBX, causes controller 203 in PBX 202 to toggle switch 207 so that data received from facilities connection 103 is coupled through digital transceiver 206 in PBX 202. In addition, controller 203 in PBX 202 provides the appropriate clock signal on lead 213 to properly strobe the data coupled to source/destination 104 in PBX 202.

The acknowledgement signal generated within PBX 202 is also coupled back to PBX 201. An acknowledgment signal indicating the successful detection of the predetermined test sequence within PBX 202 is coupled first to controller 203 in PBX 201. Upon receipt of this acknowledgment signal, the controller causes switch 207 to toggle so as to couple data transmitted from PBX 201 through digital transceiver 206. In addition, the controller also supplies the appropriate clock signal on lead 213 to clock the data from source/destination 104 at the maximum rate which can be reliably transmitted through facility connection 103.

When the predetermined test sequence is not properly detected within PBX 202, the state of the acknowledgment signal generated in this PBX causes switch 207 to toggle so as to couple any received data through μ-law modem 105. This acknowledgment signal state also causes controller 203 in PBX 202 to reduce the clock signal provided on lead 213. As described before for a successful test sequence detection, an unsuccessful test sequence detection is also coupled back to PBX 201. Within this PBX, the receipt of such an acknowledgement signal from facility connection 103 causes switch 207 to couple transmitted data from this PBX through μ-law modem 105 and causes controller 203 to alter the clock signal on lead 213 which clocks the data from source/destination 104.

The operation of each PBX, as determined by the state of the acknowledgement signal, remains unchanged until the established facility connection is changed. This will occur, for example, when the data call is ended in a typical PSTN application. In the present PSTN environment, the maximum data rate which can be reliably transmitted through a facility connection depends on whether or not such a connection is "all digital". An all digital facility connection is one which only includes one or more digital facilities. This type of facility connection can, in general, reliably transmit data at 56 kilobits/second or higher. In contrast, reliable data transmission through a facility connection which is not all digital is limited to 19.2 kilobits/second.

A preferable test sequence for determining whether or not the facility connection between PBX 201 and 202 is all digital is a pseudorandom sequence. Such a sequence can be readily provided by the incorporation of a pseudorandom number generator within test sequence generator 204. To facilitate the detection of a pseudorandom test sequence, detector 205 preferably incorporates a correlator which is specifically sensitive to the transmitted sequence. Alternatively, detector 205 can include a circuitry which generates a replica of the transmitted pseudorandom sequence and determines whether the received pseudorandom sequence is identical to the replica. In this regard, it should be appreciated that the present invention can utilize many of the techniques developed for generating training sequences and detecting the successful recovery thereof.

The operation of the embodiment of FIG. 2 has been described relative to the transmission of the predetermined test sequence by PBX 201 and the detection of the sequence within PBX 202. This sequence of events may be used to also determine the maximum rate at which data may be reliably transmitted from PBX 202 to PBX 201. Preferably, however, the transmission and detection operation described above is repeated so that the predetermined test sequence is also transmitted from PBX 202 and detected within PBX 201. This additional operation provides an independent determination of the maximum rate at which data can be reliably transmitted for each transmission direction. In FIG. 2, it is assumed that an independent determination of this maximum data rate is made and, therefore, PBX 201 and 202 have identical structures. When independent determinations are made of the maximum data rate which can be reliably transmitted in each transmission direction, controllers 203 each have the capability of selecting the minimum of the independently determined maximum reliable data rates. This minimum is then used for subsequent data communications between the PBXs.

It has been found that if the connection between the PBXs in the disclosed embodiments is purely digital, then, in most cases, a data rate of at least 56 kilobits/second can be transmitted. Moreover, in certain of these cases, a data rate of 64 kilobits/second can be reliably transmitted. More specifically, 64 kilobits/second data can be transmitted when the digital facility connection between PBXs 201 and 202 is one which insures data bit integrity. To insure data bit integrity, i.e., the bits provided to one end of a facility connection will be outputted at another end of this facility connection, certain operations can't be performed in the facility connection. For example, one such prohibited operation is robbed bit signaling, wherein the least significant information bit is periodically robbed and replaced by a signaling bit. This signaling arrangement works well and is suitable for use with voice communications but, obviously, does not insure bit integrity in data communications. Therefore, given that a facility connection is all digital, the connection could reliably transmit 56 kilobits/second data or 64 kilobits/second data.

In the embodiment shown in FIG. 2, the predetermined test sequence includes a first sequence portion at a data rate of 64 kilobits/second and a second sequence portion at a data rate of 56 kilobits/second. If the acknowledgement signal indicates the successful recovery of the 64 kilobits/second data, then the clock signal provided in each PBX to the local dam source/destination is one which causes the clocking of data at the 64 kilobits/second rate. Similarly, if the acknowledgement signal indicates the successful recovery of the 56 kilobits/second data and not the 64 kilobits/second data, then the clock signal provided to the local data source/destination is one which causes the clocking of data at the 56 kilobits/second rate. Finally, if neither the first or second sequence portions is successfully detected, the acknowledgement signal is either not transmitted or indicates the failure to recover both portions of the predetermined test sequence. In this event, the controller provides a clock signal to its local data source/destination which limits the data rate to 19.2 kilobits/second in the present PSTN environment.

Figure 3:
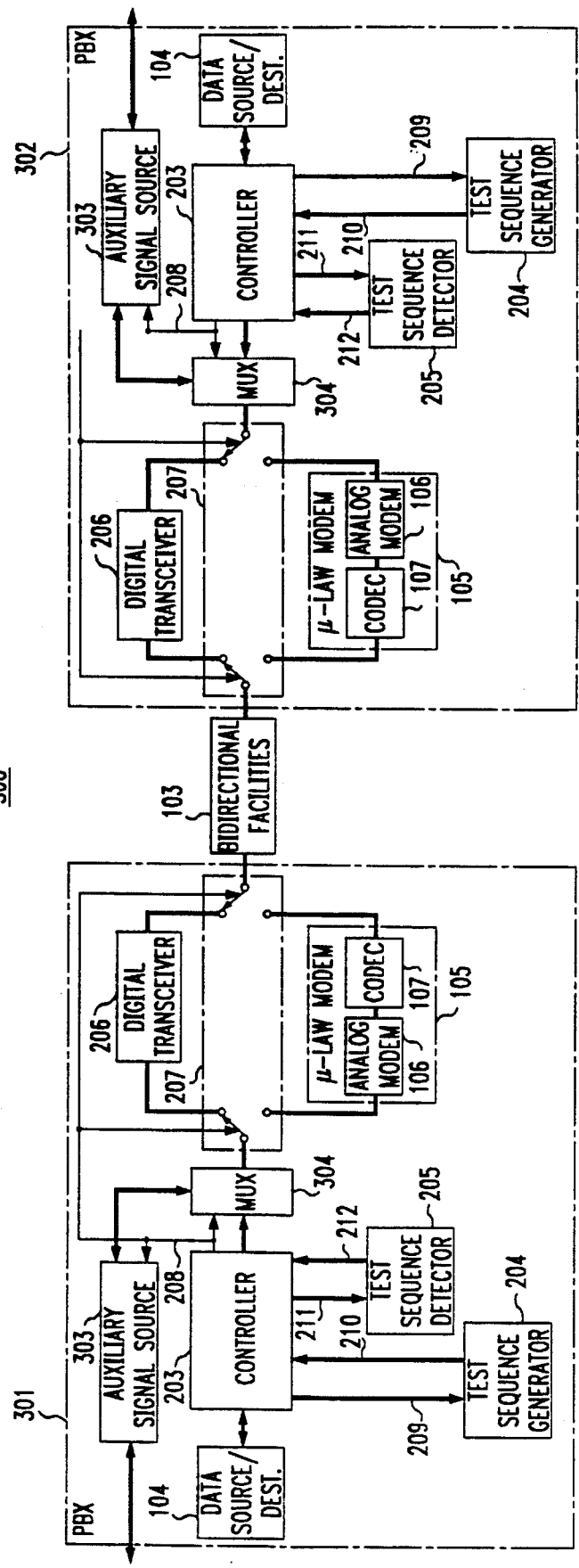
FIG. 3 is a block-schematic diagram of a second embodiment of the present invention.

Refer now to FIG. 3 which shows a second embodiment of the present invention. Embodiment 300 is intended for applications where the maximum data rate which can be outputted from source/destination 104 is less than the 56 or 64 kilobits/second data which, at certain times, can be reliably conveyed between the PBXs. In such situations, there is unused channel bandwidth and embodiment 300 is designed to make use of this bandwidth. Specifically, PBXs 301 and 302 each incorporates an auxiliary signal source/destination 303 and multiplexer (μ) 304. The auxiliary signal, coupled between the pair of source/destinations 303, may, for example, comprise a digitally encoded speech signal. Or, this auxiliary signal may represent a digitally encoded speech signal and/or auxiliary information commonly referred to as secondary channel information. When an acknowledgement signal indicates that the established facility connection between the PBXs can reliably couple 56 or 64 kilobits/second data, switch 207 in each PBX routes the data coupled between the PBXs through the digital transceivers. In addition, since it's assumed in FIG. 3 that the data rate from and to each source/destination can't be varied, there is no clock signal coupled to each such device. Instead, the control signal on lead 208 provided by each controller is coupled to each auxiliary signal source/destination. When data can be reliably coupled at 56 kilobits/second or 64 kilobits/second, the state of the control signal on lead 208 indicates the maximum reliable data rate and enables the operation of each auxiliary signal source/destination. For data transmission from PBX 301 to PBX 302, this control signal state causes multiplexer (μ) 304 in PBX 301 to multiplex the auxiliary signal and the data from the source/destination in accordance with any of a number of well-known time division multiplexing arrangements. In addition, this control signal state causes μ 304 in PBX 302 to demultiplex the received data and thereby separate the auxiliary signal from the data.

It should, of course, be noted that while the present invention has been described in reference to an illustrative embodiment, other arrangements may be apparent to those of ordinary skill in the art. First, for example, while the disclosed embodiment utilizes discrete devices, these devices can be implemented using one or more appropriately programmed, general-purpose processors or special-purpose integrated circuits or digital processors or an analog of hybrid counterparts of any of these devices. Second, while the disclosed embodiments have been described relative to data communications between a pair of PBXs, the present invention can be utilized in many other telecommunications systems. Indeed, the present invention is also not limited to communications between a pair of endpoints but can also be used in multipoint applications where data from a source is broadcast to a plurality of destinations. Third, while in the disclosed embodiments, digital transceiver 206 and μ-law modem 105 are shown as separate devices, the functionality of these devices can be provided by a microprocessor-based device which is reconfigured by the controller to provide the function of digital transceiver 206 when the facility connection 103 can transport the output of this transceiver and can be reconfigured to provide the function of μ-law modem 105 when the facility connection does not have this capability. Finally, while the disclosed embodiments have been described as being incorporated within a pair of PBXs, the present invention can be implemented within a pair of adjuncts, each adjunct being connected to a different PBX. Moreover, the present invention can also be implemented in other communications applications not involving PBXs.

We claim:

1. Apparatus for use in a communications system wherein data is communicated from a first location to at least one other location at various times via a facility connection which changes at different ones of said various times, said apparatus comprising means for transmitting a predetermined test signal from said first location to said other location via said facility connection at one of said various times; and means, responsive to an acknowledgment signal generated within each said other location and transmitted to said first location in response to said predetermined test signal, for determining whether said facility connection comprises a digital facility at said one of said various times, and said predetermined test signal is a pseudorandom sequence, which includes a first portion which is transmitted at a first rate and a second portion which is transmitted at a second rate.

2. The apparatus of claim 1 wherein said apparatus includes means for processing the data to be communicated from said first location to said second location subsequent to the receipt of said acknowledgment signal.

3. The apparatus of claim 2 wherein said apparatus further includes means, responsive to said acknowledgment signal received by said receiving means, for altering the processing of data provided by said processing means.

4. The apparatus of claim 3 wherein said altering means in response to said acknowledgment signal causes said processing means to process the data in one of several alternative modes.

5. The apparatus of claim 4 wherein the data to be communicated has values which vary with time and in one of the alternative modes the data to be communicated from said first location to said second location is processed in a manner wherein each data value is coupled through said facility connection and another of the alternative modes the data values to be communicated are altered prior to coupling to said facility connection.

6. The apparatus of claim 5 wherein said another of the alternative modes the data values to be communicated are transformed into another signal which is a digital representation of a modulated analog carder signal which, in turn, is representative of the data values.

7. The apparatus of claim 3 wherein said altering means varies the rate at which the data to be communicated is coupled to said facility connection.

8. The apparatus of claim 1 wherein said apparatus is disposed within a PBX.

9. A method for use in a communications system wherein data is communicated from a first location to at least one other location at various times via a facility connection which changes at different ones of said various times, said method comprising the steps of transmitting a predetermined test signal from said first location to said other location via said facility connection at one of said various times; and determining, in response to an acknowledgment signal generated within each said other location in response to said predetermined test signal and transmitted from each said other location, whether said facility connection comprises a digital facility at said one of said various times, and said predetermined test signal is a pseudorandom sequence.

10. Apparatus for use in a communications system wherein data is communicated from a first location to at least one other location at various times via a facility connection which changes at different ones of said various times, said apparatus comprising means for transmitting a predetermined test signal from said first location to said other location via said facility connection at one of said various times; and means, responsive to an acknowledgment signal generated within each said other location and transmitted from each said other location in response to said predetermined test signal, for determining whether said facility connection comprises a digital facility at said one of said various times, and said predetermined test signal includes first and second portions which are each transmitted at a different rate.

11. The apparatus of claim 10 wherein said predetermined test signal is pseudorandom sequence.

12. The apparatus of claim 10 wherein said apparatus is disposed within a PBX.

13. The apparatus of claim 10 wherein said apparatus includes means for processing the data to be communicated from said first location to said second location subsequent to the receipt of said acknowledgment signal.

14. The apparatus of claim 13 wherein said apparatus further includes means, responsive to said acknowledgment signal received by said receiving means, for altering the processing of data provided by said processing means.

15. The apparatus of claim 1 wherein said data is communicated at a clocked rate in response to said acknowledgment signal.

* * * * *